(12) United States Patent
Scherer et al.

(10) Patent No.: US 6,435,546 B1
(45) Date of Patent: Aug. 20, 2002

(54) COVER ASSEMBLY FOR AN AIR BAG

(75) Inventors: David F. Scherer, Ortonville; Mark M. Klozik, Shelby Township, both of MI (US); Gregory R. Kigar, Toledo, OH (US); David A. Short, Macomb, MI (US); Douglas M. Gould, Lake Orion, MI (US); Jerri A. Brachel, Macomb, MI (US); Chienhom Lee, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/385,613

(22) Filed: Aug. 30, 1999

(51) Int. Cl.$^7$ ............................................. B60R 21/16
(52) U.S. Cl. .................. 280/731; 280/728.3; 200/61.55
(58) Field of Search ............................. 280/731, 728.1, 280/728.3; 200/61.54, 61.55

(56) References Cited

U.S. PATENT DOCUMENTS

| | | |
|---|---|---|
| 5,062,661 A | 11/1991 | Winget |
| 5,369,232 A | 11/1994 | Leonelli |
| 5,523,532 A | 6/1996 | Leonelli et al. |
| 5,575,496 A | 11/1996 | Elqadah et al. |
| 5,577,766 A | 11/1996 | Niwa et al. |
| 5,590,902 A | 1/1997 | Eckhout |
| 5,615,910 A | 4/1997 | Margetak et al. |
| 5,630,617 A | 5/1997 | Hashiba |
| 5,647,610 A | 7/1997 | Nagata .................... 280/731 |
| 5,720,493 A | 2/1998 | Sugiyama et al. .......... 280/731 |
| 5,762,365 A | 6/1998 | Worrell et al. .............. 280/731 |
| 5,775,728 A | 7/1998 | Niwa et al. |
| 5,855,392 A | 1/1999 | Simpson et al. ............. 280/731 |
| 5,873,596 A | 2/1999 | Kantoh et al. ........... 280/728.2 |
| 5,957,488 A | 9/1999 | Lehman ...................... 280/731 |
| 5,979,933 A | 11/1999 | Murar et al. ................. 280/731 |
| 6,010,148 A | 1/2000 | Leonelli, Jr. et al. .... 280/728.3 |
| 6,053,526 A | 4/2000 | Preisler et al. ........... 280/728.2 |
| 6,079,734 A | 6/2000 | Porter ..................... 280/728.3 |

FOREIGN PATENT DOCUMENTS

| | | |
|---|---|---|
| DE | 19751787 | 6/1999 |
| EP | 0635400 | 1/1995 |
| EP | 0675027 | 10/1995 |

*Primary Examiner*—Robert P. Olszewski
*Assistant Examiner*—F. Zeender
(74) *Attorney, Agent, or Firm*—Tarolli, Sundheim, Covell, Tummino & Szabo L.L.P.

(57) ABSTRACT

A cover assembly (10) for covering an inflatable occupant protection device (30) comprises a cover (50). The cover (50) has an inner surface (70) for facing the inflatable occupant protection device and a manually depressible outer surface (72). An electrical switch (110) is actuatable by manual depression of the outer surface (72). A backer plate (120) supports the electrical switch (110) adjacent the inner surface (70). A plurality of openings (122) extend through the backer plate (120). A rib (94) extends from the inner surface (70) of the cover (50) around at least a portion of the periphery of the electrical switch (110). A plurality of stakes (92) extend from the inner surface (70) through the plurality of openings (122) in the backer plate (120). Each of the plurality of stakes (92) has a portion (130) connected with the rib (94) to hold the backer plate (120) on the cover (50).

18 Claims, 3 Drawing Sheets

COVER ASSEMBLY FOR AN AIR BAG

TECHNICAL FIELD

The present invention relates to a cover assembly for covering an inflatable occupant protection device.

BACKGROUND OF THE INVENTION

It is known to mount an inflatable occupant protection device, such as an air bag, on a vehicle steering wheel to help protect the vehicle driver in the event of a vehicle collision. The air bag is secured to the steering wheel as a part of an air bag module which includes an actuatable air bag inflator. In the event of sudden vehicle deceleration, such as occurs in a vehicle collision, the inflator is actuated to inflate the air bag into a position to help protect the vehicle driver from injury.

The air bag module typically includes a cover that conceals the other components of the module from view. The cover has a rupturable seam, which ruptures upon inflation of the air bag to allow the air bag to deploy through the cover and into position to help protect the vehicle driver. Between the cover and the air bag, it is common to provide an electrical horn switch, which is operable to actuate a vehicle horn by manually pressing on the outer surface of the cover. The electrical horn switch is typically a membrane-type switch known in the art.

SUMMARY OF THE INVENTION

The present invention is a cover assembly for covering an inflatable occupant protection device. The cover assembly comprises a cover having an inner surface for facing the inflatable occupant protection device and a manually depressible outer surface. An electrical switch is actuatable by manual depression of the outer surface. A backer plate supports the electrical switch adjacent the inner surface. A plurality of openings extend through the backer plate. A rib extends from the inner surface around at least a portion of the periphery of the electrical switch. A plurality of stakes extend from the inner surface through the plurality of openings in the backer plate. Each of the plurality of stakes has a portion connected with the rib to hold the backer plate on the cover.

The portion of each of the plurality of stakes connected to the rib comprises material of the portion which is adhered to and commingled with material of the rib. The backer plate engages a part of the inner surface and is held against the part of the inner surface by the plurality of stakes.

The cover has a first thickness where the manually depressible outer surface is located and a second thickness where the backer plate engages the part of the inner surface. The second thickness is greater than the first thickness. The part of the inner surface provides a space between the backer plate and another part of the inner surface so that the electrical switch is not normally pressed between the backer plate and the inner surface. The part of the inner surface underlies a depression in the outer surface.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
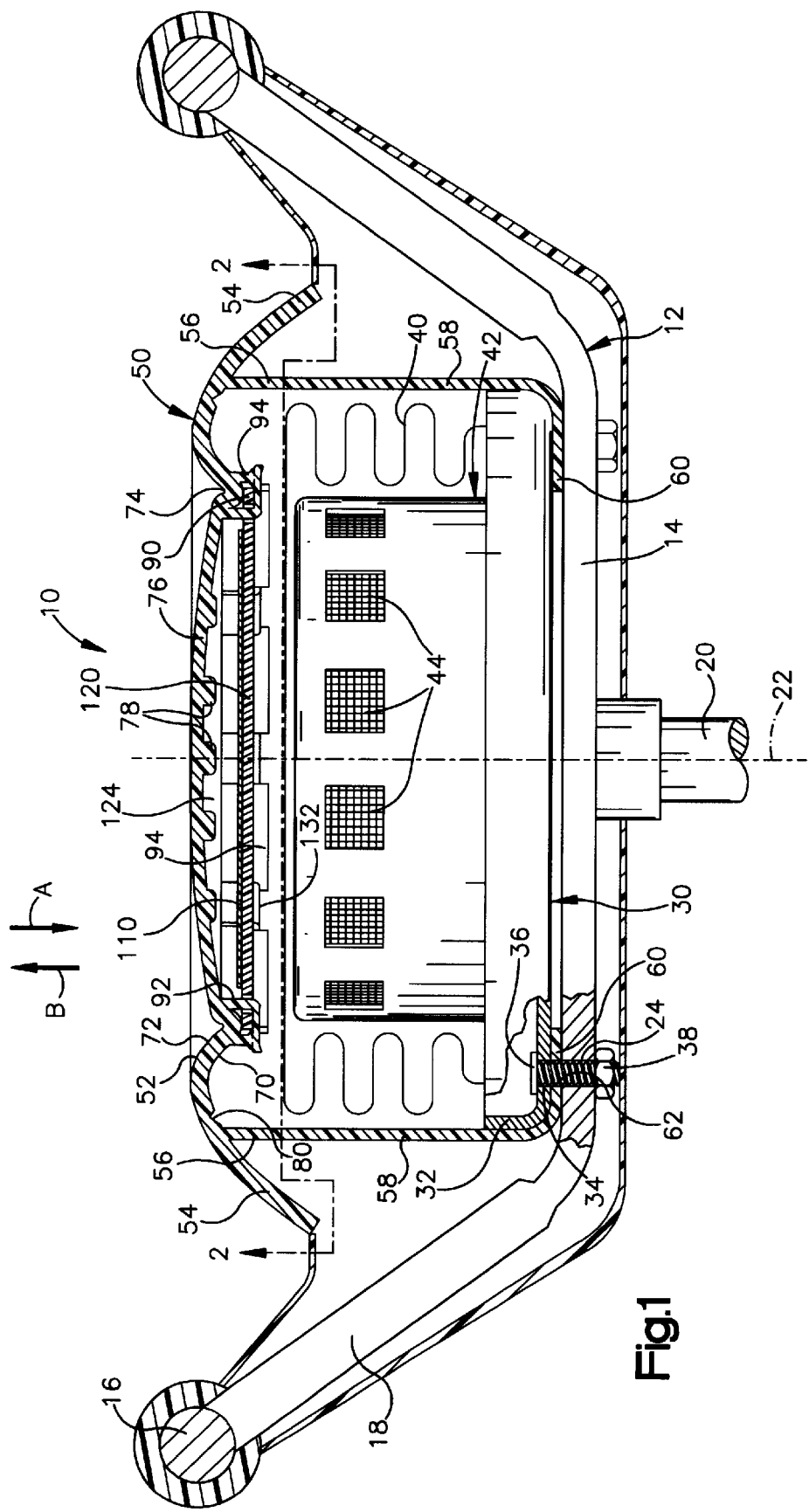
FIG. 1 is a schematic view, partly in section, of an apparatus constructed in accordance with the present invention for mounting on a vehicle steering wheel and for covering an inflatable occupant protection device on the steering wheel.

The present invention relates to a cover assembly for covering an inflatable occupant protection device. As representative of the present invention, FIG. 1 illustrates a cover assembly 10 mounted on a vehicle steering wheel 12. The steering wheel 12 includes a metal armature having a hub portion 14 connected by a plurality of spokes 18 to a ring-shaped portion 16. The hub portion 14 is supported on a vehicle steering shaft 20, which is rotatable about an axis 22. The hub portion 14 of the steering wheel 12 includes a plurality of openings 24, only one of which is shown.

An air bag module 30 is mounted to the hub portion 14 of the steering wheel 12. The air bag module 30 includes a base plate 32 having a plurality of apertures 34, only one of which is shown, which align with the plurality of openings 24 in the hub portion 14 of the steering wheel 12. A threaded bolt 36 projects through each aperture 34 in the base plate 32 and through each opening 24 in the hub portion 14. A nut 38 is screwed onto each of the threaded bolts 36 projecting from the openings 24 in the hub portion 14 to secure the base plate 32 to the steering wheel 12.

The air bag module 30 includes an air bag 40 and an actuatable inflator 42, both of which are attached to the base plate 32 in a known manner (not shown). The air bag 40, which encircles the inflator 42, is illustrated schematically in a deflated, folded condition in FIG. 1. The air bag 40 may be made from a fabric material such as woven nylon, or from a non-woven material such as a plastic film.

The inflator 42 has a plurality of fluid outlets 44 for directing inflation fluid into the air bag 40 upon actuation of the inflator. The inflator 42 is illustrated as a pyrotechnic inflator, which uses the combustion of gas-generating material to produce inflation fluid in the form of gas to inflate the air bag 40. The air bag module 30 could alternatively employ an inflator that contains a stored quantity of pressurized inflation fluid, or a combination of pressurized inflation fluid and an ignitable material for heating the inflation fluid.

The air bag module 30 also includes a cover 50, which is attached to the steering wheel 12 and which covers the other components of the module 30. The cover 50 is preferably made from a thermoplastic material that is strong enough to protect the other components of the air bag module 30 underneath the cover. The thermoplastic material is also sufficiently flexible that the cover can be resiliently deformed by manual pressure from a vehicle occupant.

The cover 50 has a main body portion 52, a plurality of radially extending spoke portions 54, a side wall portion 56, and a pair of oppositely disposed mounting portions 58. The side wall portion 56 projects from the main body portion 52 toward the hub portion 14 of the steering wheel 12. The mounting portions 58 extend from the side wall portion 56 farther toward the hub portion 14 of the steering wheel 12. An inwardly projecting terminal end 60 of each of the mounting portions 58 of the cover 50 is inserted between the base plate 32 of the air bag module 30 and the hub portion 14 of the steering wheel 12.

A plurality of holes 62, only one of which is shown in FIG. 1, are formed near the terminal ends 60 of the mounting portions 58 and align with the openings 34 in the base plate 32 of the air bag module 30. The bolts 36 extend through the holes 62 in the mounting portions 58. When the nuts 38 are tightened on the bolts 36, the terminal ends 60 of the mounting portions 58 of the cover 50 are securely clamped between the base plate 32 and the hub portion 14 of the steering wheel 12.

Figure 5:
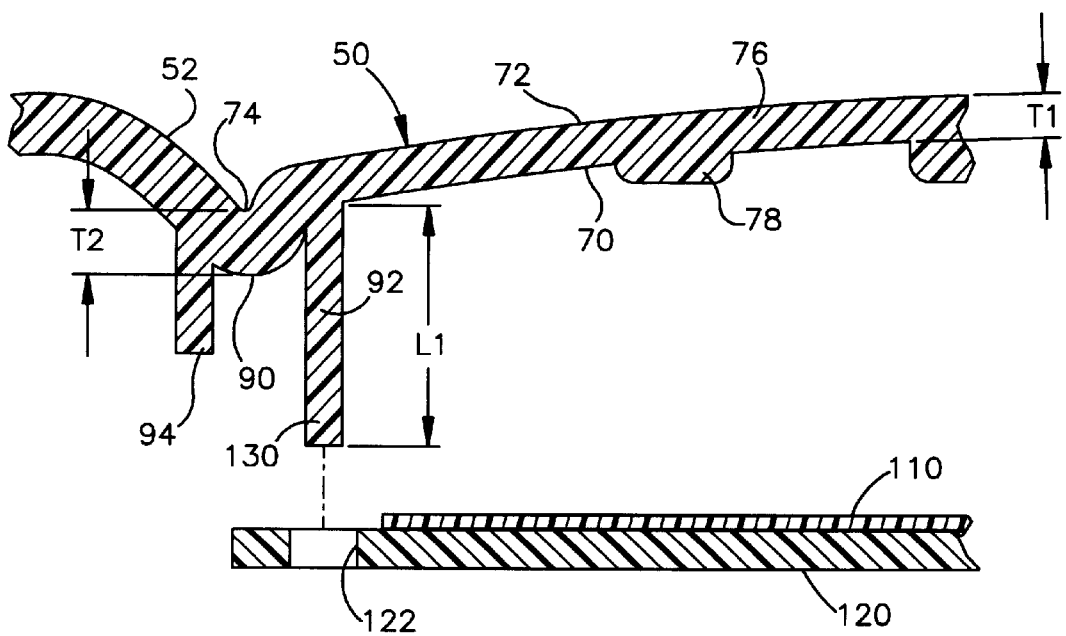
FIG. 5 is an exploded view similar to FIG. 4 illustrating the apparatus in a partially assembled condition.

The main body portion 52 of the cover 50 has inner and outer surfaces 70 and 72. The outer surface 72 includes a circular depression 74, which defines a manually depressible central section 76 of the main body portion 52 of the cover 50. The central section 76 includes a plurality of circular projections 78, which extend inwardly from the inner surface 70. The thickness T1 (FIG. 5) of the material of the cover 50 between the inner and outer surfaces 70 and 72 in the central section 76 of the cover is preferably approximately 2 mm, except where the projections 78 are located.

Figure 2:
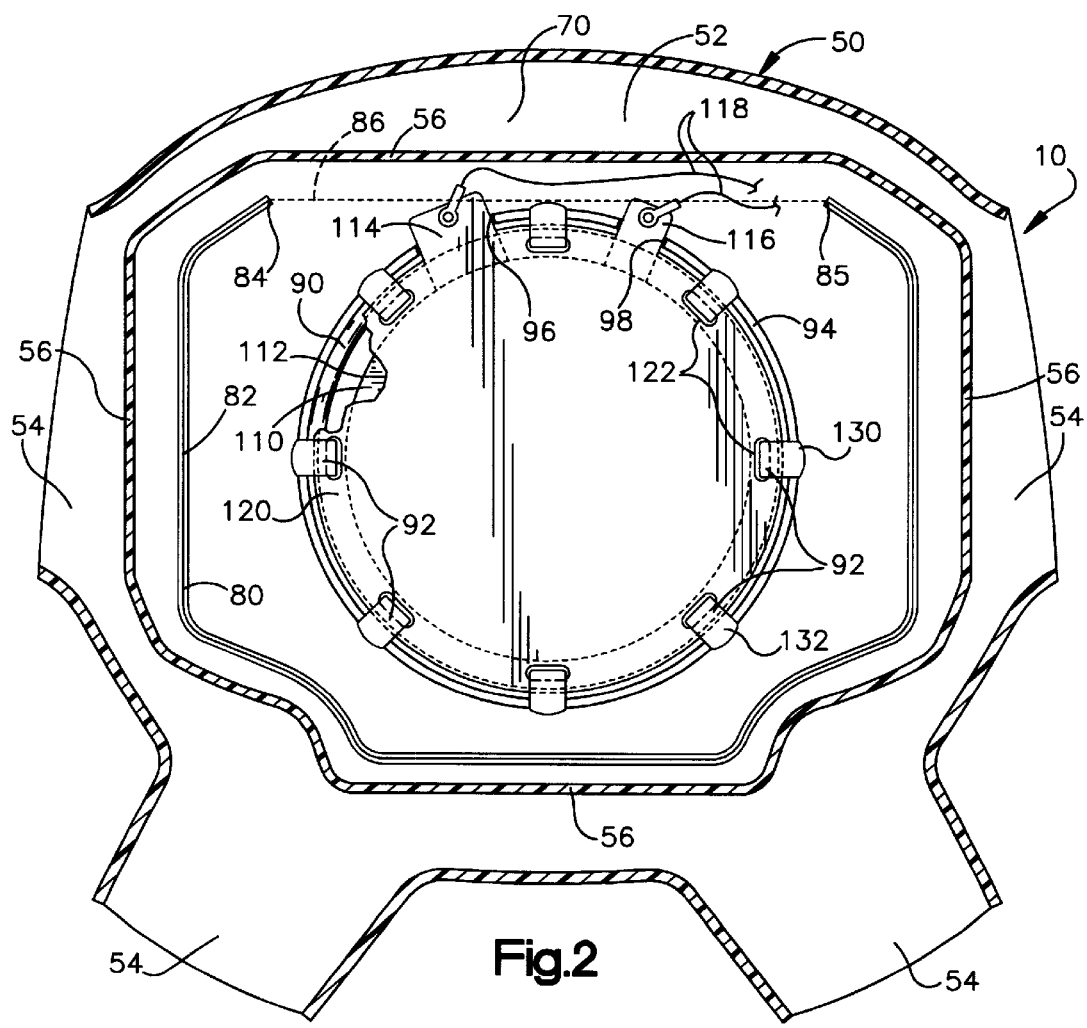
FIG. 2 is a sectional view taken along line 2—2 in FIG. 1.

A tear seam 80 (FIG. 2) is formed on the inner surface 70 of the main body portion 52 of the cover 50 by a V-shaped groove 82. The groove 82 extends approximately three fourths of the way around the perimeter of the central section 76 of the main body portion 52. The tear seam 80 has first and second terminal ends 84 and 85 lying on a common line, which defines a hinge axis 86 for the main body portion 52 of the cover 50. As is known in the art, when the air bag 40 is inflated by the inflator 42, the tear seam 80 ruptures under the force of the inflating air bag to enable the air bag to deploy into the passenger compartment of the vehicle. When the tear seam 80 is ruptured, the main body portion 52 of the cover 50 pivots at the hinge axis 86 and is retained by the material of the cover located along the hinge axis.

Figure 3:
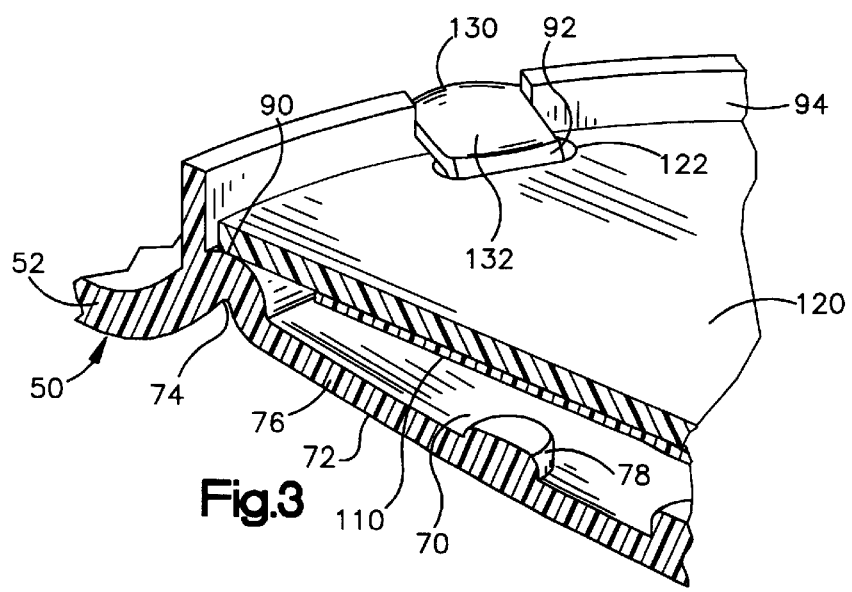
FIG. 3 is an inverted, perspective sectional view of a portion of the apparatus of FIG. 1.

The circular depression 74 in the outer surface 72 of the cover 50 forms a ring-shaped ledge 90 on the inner surface 70 of the cover circumscribing the central section 76 of the cover. The ledge 90 on the inner surface 70 thus underlies the depression 76 in the outer surface 72, as best seen in FIG. 3. The thickness T2 (FIG. 5) of the material of the cover 50 between the depression 76 in the outer surface 72 of the cover and the ledge 90 on the inner surface 70 of the cover is preferably approximately 3 mm. The material of the remainder of the cover 50, other than the central section 76, has a thickness at least equal to the thickness T2 and is preferably approximately 3 mm.

The cover 50 further includes a plurality of stakes 92 and a ring-shaped rib 94. The stakes 92 are disposed circumferentially around the inside of the ledge 90 in the central section 76 of the cover 50. The stakes 92 project axially from the inner surface 70 of the cover 50 and are formed with an initial length L1. The ring-shaped rib 94 extends circumferentially around the outside of the ledge 90 on the inner surface 70 of the main body portion 52 of the cover 50. The rib 94 and the plurality of stakes 92 are thus separated in the radial direction by the ledge 90. The rib 94 projects axially from the inner surface 70 and is shorter in length than the stakes 92. The rib 94 includes adjacently disposed first and second notches 96 and 98 (FIG. 2) located near the hinge axis 86 of the cover 50.

The cover assembly 10 includes an electrical switch 110 for actuating a vehicle horn (not shown). The switch is preferably a known membrane-type switch which includes first and second layers (not shown) of electrically conductive material separated by dielectric material (not shown). The layers of conductive material are engagable with each other, in response to the application of force to the switch, to change the resistance of the switch 110 and thereby to cause the vehicle horn to actuate.

The switch 110 has a circular periphery 112 and includes first and second tabs 114 and 116, which project radially outward from the circular periphery. The circular periphery 112 of the switch 110 is smaller in diameter than the ledge 90. The switch 110 also fits radially inside of the plurality of stakes 92 projecting from the inner surface 70. The first and second tabs 114 and 116 extend across the ledge 90 and are received in the first and second notches 96 and 98, respectively, in the rib 94. Lead wires 118 extend from the tabs 114 and 116 and connect the switch 110 with the vehicle horn and with a source of electrical power (not shown).

A backer plate 120 is disposed adjacent the electrical switch 110 for supporting the switch. The backer plate 120 is preferably made of a relatively rigid plastic material so that force applied to the central section 76 of the cover 50 can result in a resistance change in the switch 110 which, in turn, causes the horn to actuate. The backer plate 120 has a circular shape with an outer diameter that is approximately the same as the diameter of the ledge 90 on the inner surface 70 of the cover 50. The backer plate 120 thus has a smaller diameter than the inside diameter of the rib 94 on the inner surface 70.

Figure 4:
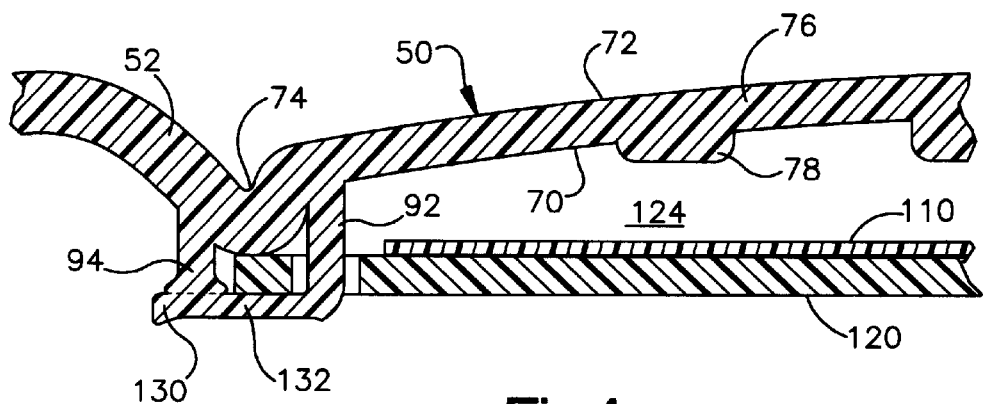
FIG. 4 is an enlarged view of a portion of the apparatus of FIG. 1.

A plurality of slots 122 are formed in the backer plate 120 near its periphery. The slots 122 are located in a circular pattern so that they align with the plurality of stakes 92 extending from the inner surface 70 of the cover 50. The stakes 92 extend through the slots 122 in the backer plate 120, and the periphery of the backer plate contacts the ledge 90. With the backer plate 120 abutting the ledge 90, an axial space 124 (FIG. 4) is formed between the backer plate and the projections 78 on the inner surface 70 in the central section 76 of the cover 56. The electrical switch 110 is free to move in the space 124 and is not normally pressed between the backer plate 120 and any part of the inner surface 70, including the projections 78.

The backer plate 120 is secured to the cover 50 by the stakes 92 extending through the slots 122 in the backer plate. More particularly, an end portion 130 of each stake 92 is brought into contact with the ring-shaped rib 94 by bending the stake in a radially outward direction. Each stake 92 is bent at approximately the midpoint of the initial length L1 of the stake. The end portion 130 of each stake 94 is then connected to the rib 94 using a known heating process, such as ultrasonic welding. The thermoplastic material of the end portion 130 of each stake 92 is thus adhered to and commingled with the thermoplastic material of the rib 94, forming a plurality of bridges 132 connecting the stakes with the rib. The heating process used to form the bridges 132 causes the end portions 130 of the stakes 92 to be recessed into the rib 94, as may be seen in FIG. 1.

To operate the vehicle horn, the vehicle driver exerts manual pressure in the direction of arrow A in FIG. 1 on the outer surface 72 in the central section 76 of the cover 50. The manual pressure applied to the central section 76 of the cover 50 is transmitted through the cover to the electrical switch 110 by the projections 78. More specifically, the pressure forces one or more of the projections 78 into contact with one of the layers of conductive material in the switch 110. This contact causes the layers of conductive material in the switch 110 to engage one another and change the resistance of the switch which, in turn, causes the vehicle horn to sound.

When the manual pressure on the outer surface 70 in the central section 76 of the cover 50 is released, the resilience of the material of the cover causes the central section to move in the direction of arrow B in FIG. 1 and return to its original position (shown in FIG. 1). As this movement of the cover 50 occurs, the switch 110 returns to its original condition and the electrical resistance of the switch returns to its previous level. This change in the resistance of the switch 110 causes the vehicle horn to de-energize and discontinue sounding.

The heat-staked connection of the stakes 82 to the rib 94 secures the backer plate 120, and thus the switch 110, to the central section 76 of the cover 50. The switch 110 and the backer plate 120 will remain attached to the central section even when the tear seam 80 ruptures to allow the air bag 40 to deploy.

From the above description of the invention, those skilled in the art will perceive improvements, changes and modifications. Such improvements, changes and modifications within the skill of the art are intended to be covered by the appended claims.

Having described the invention, we claim:

1. A cover assembly for covering an inflatable vehicle occupant protection device, said cover assembly comprising:
   a cover having an inner surface for facing the inflatable vehicle occupant protection device and an outer surface;
   an electrical switch actuatable by manual depression of a manually depressible portion of said outer surface; and
   a backer plate for supporting said electrical switch adjacent said inner surface, said backer plate having a plurality of openings extending through said backer plate, said backer plate further having an outer diameter,
   said backer plate engaging a first part of said inner surface, a second part of said inner surface being spaced from said electrical switch and underlying said manually depressible portion of said outer surface, said first part of said inner surface underlying a groove in said outer surface, said groove defining a perimeter of said manually depressible portion of said outer surface of said cover,
   said cover including a rib extending from said inner surface around at least a portion of the periphery of said backer plate, said rib having an inner diameter larger than said outer diameter of said backer plate, said cover further including a plurality of stakes extending from said inner surface through said plurality of openings in said backer plate, each of said plurality of stakes having a portion connected with said rib to hold said backer plate on said cover.

2. The cover assembly defined in claim 1 wherein said portion of each of said plurality of stakes connected to said rib comprises material of said portion of each of said plurality of stakes which is adhered to and commingled with material of said rib.

3. The cover assembly defined in claim 1 wherein said electrical switch has at least one projecting tab which extends through an opening in said rib, said rib encircling the periphery of said electrical switch except at said at least one projecting tab.

4. The cover assembly defined in claim 1 wherein said rib has a circular periphery and said switch comprises a membrane switch with a circular periphery.

5. A cover assembly for covering an inflatable vehicle occupant protection device, said cover assembly comprising:
   a cover having an inner surface for facing the inflatable vehicle occupant protection device and a manually depressible outer surface;
   an electrical switch actuatable by manual depression of said outer surface; and
   a planar backer plate for supporting said electrical switch adjacent said inner surface, said backer plate having a plurality of openings extending through said backer plate, said backer plate further having an outer diameter,
   said cover including a rib extending from said inner surface around at least a portion of the periphery of said backer plate, said rib having an inner diameter larger than said outer diameter of said backer plate, said cover further including a plurality of stakes extending from said inner surface through said plurality of openings in said backer plate, each of said plurality of stakes having a portion connected with said rib to hold said backer plate on said cover,
   said backer plate engaging a part of said inner surface and being held against said part of said inner surface by said plurality of stakes.

6. The cover assembly defined in claim 5 wherein said cover has a first thickness where said manually depressible outer surface is located and a second thickness where said backer plate engages said part of said inner surface, said second thickness being greater than said first thickness.

7. The cover assembly defined in claim 5 wherein said part of said inner surface provides a space between said backer plate and another part of said inner surface so that said electrical switch is not normally pressed between said backer plate and said inner surface.

8. The cover assembly defined in claim 5 wherein said part of said inner surface underlies a depression in said outer surface.

9. A cover assembly for covering an inflatable vehicle occupant protection device, said cover assembly comprising:
   a cover having an inner surface for facing the inflatable vehicle occupant protection device and an outer surface;
   an electrical switch actuatable by manual depression of a manually depressible portion of said outer surface; and
   a backer plate for supporting said electrical switch adjacent said inner surface,
   said backer plate engaging a first part of said inner surface, a second part of said inner surface being spaced from said electrical switch and underlying said manually depressible portion of said outer surface, said first part of said inner surface underlying a groove in said outer surface, said groove being circular, said circular groove defining a perimeter of said manually depressible portion of said outer surface of said cover.

10. The cover assembly defined in claim 9 wherein said first part of said inner surface is ring-shaped.

11. The cover assembly defined in claim 9 wherein said cover has a first thickness where said second part of said inner surface is located and a second thickness where said backer plate engages said first part of said inner surface, said first thickness being less than said second thickness.

12. The cover assembly defined in claim 9 wherein said backer plate has a plurality of openings extending through said backer plate and said inner surface of said cover includes a plurality of stakes extending through said plurality of openings in said backer plate.

13. The cover assembly defined in claim 12 wherein said inner surface of said cover includes a rib extending from said inner surface around at least a portion of the periphery of said electrical switch, each of said plurality of stakes having a portion connected with said rib to hold said backer plate on said cover.

14. The cover assembly defined in claim 9 wherein said first part of said inner surface is disposed between said second part of said inner surface and a third part of said inner surface, said cover having a first thickness where said backer plate engages said first part of said inner surface, said cover having a second thickness where said third part of said inner surface is located, said second thickness being at least approximately equal to said first thickness.

15. A cover assembly for covering an inflatable occupant protection device, said cover assembly comprising:

a cover having an inner surface for facing the inflatable occupant protection device and a manually depressible outer surface;

an electrical switch actuatable by manual depression of said outer surface; and a backer plate for supporting said electrical switch, said backer plate having a plurality of openings, said cover including a rib, a ledge, and a plurality of stakes, said rib and said ledge both extending from said inner surface around at least a portion of the periphery of said electrical switch, said plurality of stakes extending from said inner surface through said plurality of openings in said backer plate, each of said plurality of stakes having a portion connected with said rib to secure said backer plate in abutting engagement with said ledge.

16. The cover assembly as defined in claim 15 wherein said ledge circumscribes a central portion of said cover.

17. The cover assembly as defined in claim 15 wherein said rib extends around at least a portion of the periphery of said backer plate.

18. The cover assembly defined in claim 9 wherein said groove comprises a V-shaped groove.

* * * * *

UNITED STATES PATENT AND TRADEMARK OFFICE
CERTIFICATE OF CORRECTION

PATENT NO. : 6,435,546 B1
DATED : August 20, 2002
INVENTOR(S) : David F. Scherer et al.

It is certified that error appears in the above-identified patent and that said Letters Patent is hereby corrected as shown below:

<u>Title page,</u>
Item [73], Assignee, after "Lyndhurst, OH" insert -- ,DaimlerChrysler Corporation, Auburn Hills, MI --.

Signed and Sealed this

Thirteenth Day of September, 2005

JON W. DUDAS
*Director of the United States Patent and Trademark Office*